(12) United States Patent
Ma et al.

(10) Patent No.: US 8,543,318 B2
(45) Date of Patent: Sep. 24, 2013

(54) CONTROLLED ENGINE SHUTDOWN SYSTEM FOR A STOP-START SYSTEM AND A HYBRID ELECTRIC VEHICLE

(75) Inventors: Qi Ma, Farmington Hills, MI (US); Robert Douglas Shafto, New Hudson, MI (US)

(73) Assignee: GM Global Technology Operations LLC

( * ) Notice: Subject to any disclaimer, the term of this patent is extended or adjusted under 35 U.S.C. 154(b) by 695 days.

(21) Appl. No.: 12/835,835

(22) Filed: Jul. 14, 2010

(65) Prior Publication Data
US 2011/0295494 A1 Dec. 1, 2011

Related U.S. Application Data

(60) Provisional application No. 61/350,198, filed on Jun. 1, 2010.

(51) Int. Cl.
*F02D 28/00* (2006.01)
*F02N 11/08* (2006.01)
*F02D 17/02* (2006.01)

(52) U.S. Cl.
USPC ............... 701/112; 123/179.4; 123/198 F

(58) Field of Classification Search
USPC ...... 701/112, 113, 101, 102, 115; 123/198 F, 123/179.4, 179.15, 333
See application file for complete search history.

(56) References Cited

U.S. PATENT DOCUMENTS

| | | | |
|---|---|---|---|
| 4,958,516 A | 9/1990 | Stiles et al. | |
| 5,803,040 A * | 9/1998 | Biesinger et al. | 123/198 F |
| 6,275,759 B1 | 8/2001 | Nakajima et al. | |
| 6,758,190 B2 | 7/2004 | Denz et al. | |
| 7,079,935 B2 | 7/2006 | Lewis et al. | |
| 7,079,941 B2 * | 7/2006 | Tetsuno et al. | 701/112 |
| 7,130,731 B2 | 10/2006 | Itoh et al. | |
| 7,146,960 B2 * | 12/2006 | Phlips et al. | 123/179.4 |
| 7,177,755 B2 * | 2/2007 | Nishikawa et al. | 701/112 |
| 7,204,226 B2 * | 4/2007 | Zillmer et al. | 123/481 |
| 8,442,747 B2 * | 5/2013 | Ma et al. | 701/112 |
| 2006/0048734 A1 | 3/2006 | Kataoka et al. | |
| 2007/0163531 A1 | 7/2007 | Lewis et al. | |
| 2008/0275624 A1 | 11/2008 | Snyder | |
| 2009/0066337 A1 | 3/2009 | Gibson et al. | |
| 2009/0299586 A1 | 12/2009 | Miller et al. | |
| 2010/0038158 A1 | 2/2010 | Whitney et al. | |
| 2010/0211299 A1 | 8/2010 | Lewis et al. | |
| 2012/0245831 A1 | 9/2012 | Patterson et al. | |

OTHER PUBLICATIONS

Ohata et al., "Benchmark Problem for Automotive Engine Control", SICE Annual Conference, Sep. 2007, pp. 1723-1726.

(Continued)

*Primary Examiner* — Hieu T Vo

(57) ABSTRACT

An engine system includes a stop-start module that generates a shut down signal to shut down an engine. A friction module that generates a friction signal based on the engine shut down signal. The friction signal indicates an estimate of a sum of friction forces between components of the engine. A position module estimates a position of the engine and generates a position signal. An energy module estimates kinetic energy of the engine based on the friction signal and the position signal. A cylinder deactivation module stops the engine based on the kinetic energy in at least one of (i) a predetermined position and (ii) a predetermined range.

19 Claims, 5 Drawing Sheets

(56) References Cited

OTHER PUBLICATIONS

Rokusho et al., "Combined Feedforward and Feedback Control for Start-Up Engine Control", 27th Chinese Control Conference, Jul. 2008, pp. 562-565.
Zhang et al., "Model-Based Cold-Start Speed Control Design for SI Engines", Proceedings of the 17th World Congress of the International Federation of Automatic Control, Jul. 2008, pp. 1042-1047.
Saerens et al., "Minimization of the Fuel Consumption of a Gasoline Engine Using Dynamic Optimization", Applied Energy, vol. 86 Iss. 9, Sep. 2009, pp. 1582-1588.
U.S. Appl. No. 12/835,830, filed Jul. 14, 2010, Qi Ma et al.
U.S. Appl. No. 12/835,842, filed Jul. 14, 2010, Qi Ma et al.
U.S. Appl. No. 12/835,848, filed Jul. 14, 2010, Qi Ma et al.
U.S. Appl. No. 12/835,856, filed Jul. 14, 2010, Qi Ma et al.
U.S. Appl. No. 12/835,942, filed Jul. 14, 2010, Qi Ma et al.
U.S. Appl. No. 12/835,951, filed Jul. 14, 2010, Qi Ma et al.

* cited by examiner

# CONTROLLED ENGINE SHUTDOWN SYSTEM FOR A STOP-START SYSTEM AND A HYBRID ELECTRIC VEHICLE

CROSS-REFERENCE TO RELATED APPLICATIONS

This application claims the benefit of U.S. Provisional Application No. 61/350,198, filed on Jun. 1, 2010. The disclosure of the above application is incorporated herein by reference in its entirety.

This application is related to U.S patent application Ser. Nos. 12/835,830 filed on Jul. 14, 2010, 12/835,842 filed on Jul. 14, 2010, 12/835,848 filed on Jul. 14, 2010, 12/835,856 filed on Jul. 14, 2010, 12/835,942 filed on Jul. 14, 2010, and 12/835,951 filed on Jul. 14, 2010.The disclosures of the above applications are incorporated herein by reference in their entirety.

FIELD

The present disclosure relates to hybrid electric vehicles and stop-start engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A stop-start vehicle and a hybrid electric vehicle (HEV) may each include an internal combustion engine (ICE), one or more electric motors and a control module. The stop-start vehicle and the HEV may shut down (deactivate) an ICE, for example, to reduce the amount of time the ICE is idling. This improves fuel economy and reduces emissions. The ICE may be shut down when vehicle speed is less than a threshold.

In a stop-start system and in a HEV system an ICE may be shut down and/or transitioned to an at rest state (i.e. engine speed is equal to 0 revolutions/second). The ICE may be automatically started, for example, when an accelerator pedal is actuated.

Camshafts and a crankshaft of an engine stop rotating to rest positions during engine shut down. The rest positions can vary and/or be random. Inconsistent shut down positions cause restart unpredictability.

SUMMARY

An engine system is provided and includes a stop-start module that generates a shut down signal to shut down an engine. A friction module that generates a friction signal based on the engine shut down signal. The friction signal indicates an estimate of a sum of friction forces between components of the engine. A position module estimates a position of the engine and generates a position signal. An energy module estimates kinetic energy of the engine based on the friction signal and the position signal. A cylinder deactivation module stops the engine based on the kinetic energy in at least one of (i) a predetermined position and (ii) a predetermined range.

In other features, a method of operating a stop-start system is provided. The method includes generating a shut down signal to shut down an engine. A friction signal is generated based on the engine shut down signal. The friction signal indicates an estimate of a sum of friction forces between components of the engine. A position of the engine is estimated and a position signal is generated. Kinetic energy of the engine is estimated based on the friction signal and the position signal. The engine is stopped based on the kinetic energy in at least one of (i) a predetermined position and (ii) a predetermined range.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
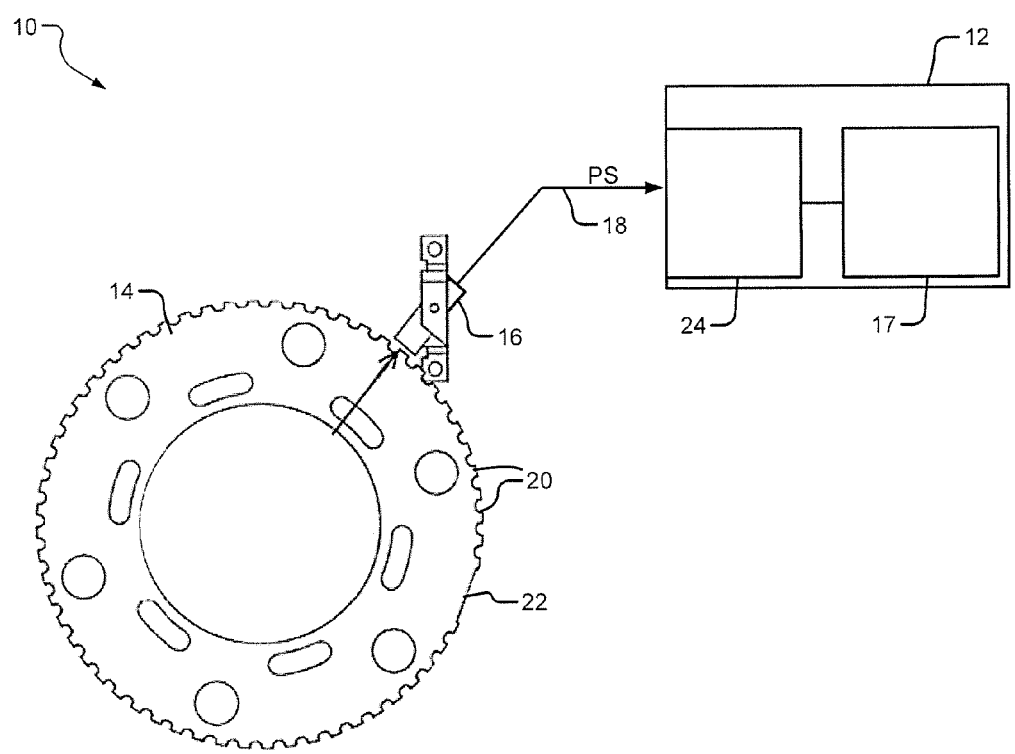
FIG. 1 is a front view of a position sensing system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In FIG. 1, a position sensing system 10 is shown. The position sensing system 10 includes an engine control module (ECM) 12, a position indicating wheel 14 and one or more position sensors (a single position sensor 16 is shown). The position indicating wheel 14 is used to determine positions of moving parts of an engine. The position indicating wheel 14 may be located on a crankshaft, camshaft, or other shaft of an engine. As another example, the position indicating wheel 14 may be located on a shaft of a transmission. The ECM 12 includes an engine position module 17 that determines position of the position indicating wheel 14 based on a position signal PS 18 received by the position sensor 16.

The position indicating wheel 14 includes teeth 20 and a gap 22 (non-toothed zone). The position sensor 16 detects oncoming (rising) and passing (falling) edges of each of the teeth 20. The position indicating wheel 14 may have any number of teeth. The gap 22 may be an area of the position indicating wheel 14 that does not include teeth. The gap 22 may be used as a reference or calibration area to verify rotational position of the position indicating wheel 14 relative to, for example, the position sensor 16 or to some other reference point.

The ECM 12 includes the engine position module 17 and an input and output (I/O) interface 24. The I/O interface 24 receives the position signal PS 18 from the position sensor 16. The engine position module 17 may determine, for example rotational position and/or speed of a crankshaft and/or a camshaft based on information received from the position sensor 16.

During a stop-start event, an engine is shut down and then restarted. Position and/or speed of the engine are determined during startup of the engine. Errors in the determined position and/or speed of the position indicating wheel 14 can result due to failure of detecting if the gap 22 is too close to tip of the position sensor 16 during the startup. At rest position (stopped position) of the position indicating wheel 14 can vary for each shut down event of an engine. Errors in position detection can result if the position indicating wheel 14 is stopped such that the gap 22 is aligned with the position sensor 16 or is positioned before and within a predetermined rotational distance from the position sensor 16. These errors can cause either longer crank times or mistakes in fuel and spark delivery. A cranking mode refers to, for example, when a crankshaft of an engine is rotated during startup via a starter and/or electric motor. This can result in longer start times, system vibrations, and degraded emission performance.

To prevent position detection errors, the following embodiments provide controlled engine shut downs. An engine is shut down and stopped at a predetermined position and/or within a predetermined range. This allows an engine position module during startup to accurately detect a gap and position of a position indicating wheel.

Figure 2:
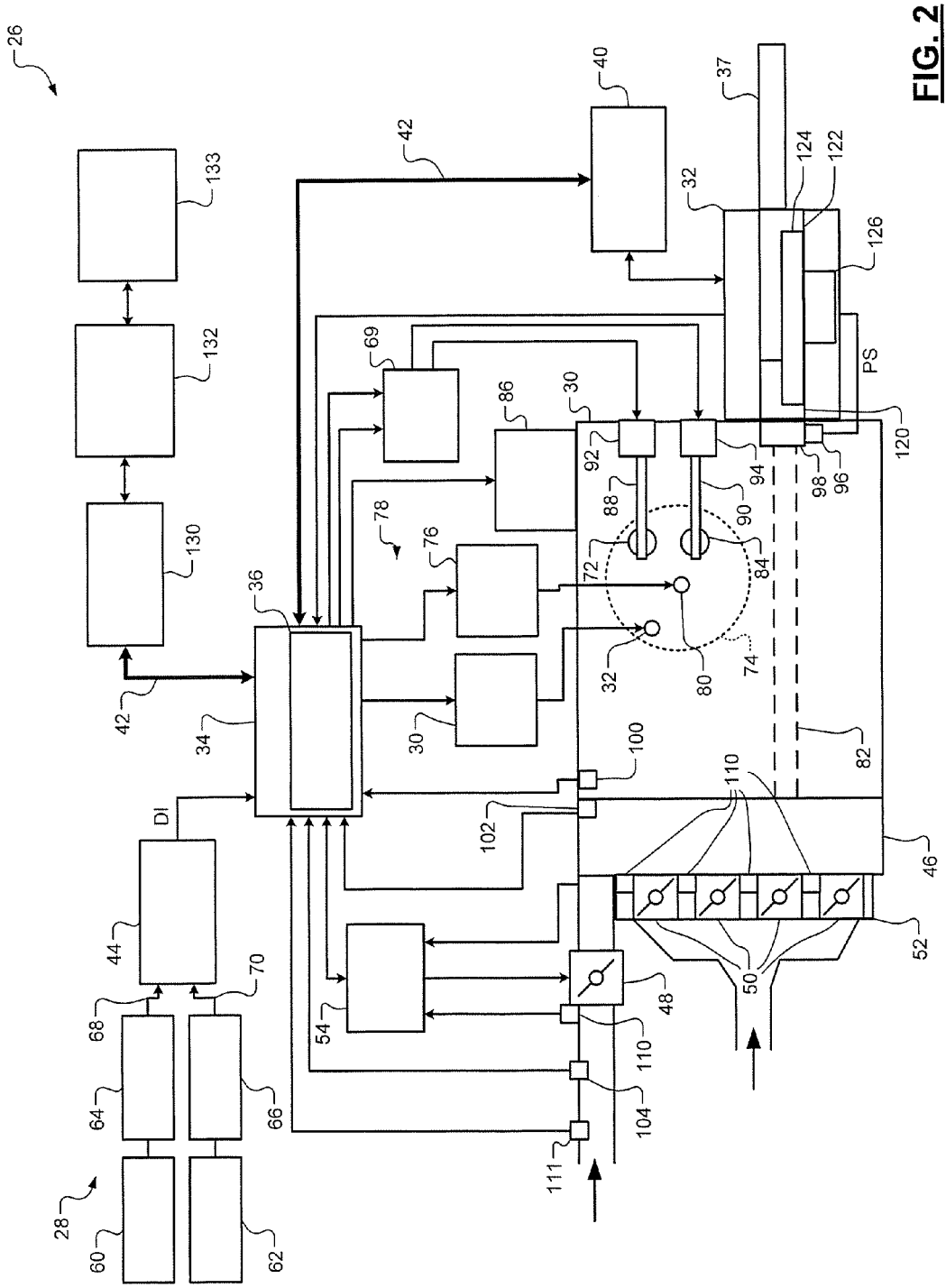
FIG. 2 is a functional block diagram of an engine system in accordance with the present disclosure.

In FIG. 2, an exemplary engine system 26 and corresponding stop-start control system 28 are shown. The engine system 26 includes an internal combustion engine (ICE) 30 and a transmission system 32. The ICE 30 has a corresponding ECM 34. The stop-start control system 28 includes the ECM 34, which has a shut down control module 36. The ECM 34 shuts down and starts the ICE 30 when certain conditions are satisfied to conserve fuel and provide a requested amount of torque output. Example conditions are described below.

The engine system 26 and the stop-start control system 28 operate in an auto-stop mode and an auto-start mode. During the auto-stop mode, speed of the ICE 30 is decreased and fuel and spark of the ICE 30 are deactivated. The shut down control module 34 controls parameters of the engine and transmission to position the engine (i.e. crankshaft and/or camshaft) in a predetermined at rest (stopping) position and/or in a predetermined stopping range.

The engine parameters may include, for example, engine speed, manifold pressures, fuel parameters, spark (ignition) parameters, throttle positions, etc. The fuel parameters may include, for example, fuel injection quantity, fuel injection pressure, fuel injection timing, etc. The spark parameters may include, for example, spark energy and spark timing. The transmission parameters may include, for example, transmission loads, transmission oil pressures, clutch engage states, gear engage states, shift patterns, downshifting rates, etc.

During the auto-stop mode, the ICE 30 is stalled, such that the ICE 30 is shut down and speed of the ICE 30 is equal to 0 revolutions/second (rev/s). The speed of the ICE 30 is equal to 0 rev/s when, for example, the crankshaft of the ICE 30 is not rotating. The ICE 30 may be considered shut down (deactivated) when fuel (or fuel system) and spark (or ignition system) are deactivated. The speed of the ICE 30 may, for example, be ramped down from a current speed to 0 rev/s during the auto-stop mode.

During the auto-start mode, the ICE 30 may be cranked and speed of the ICE 30 may be increased to an idle speed. Fuel and spark may be activated during the auto-start mode.

While a spark ignition type engine is described herein, the present disclosure is applicable to other types of torque producers, such as gasoline type engines, gaseous fuel type engines, diesel type engines, propane type engines, and hybrid type engines. The transmission system 32 has a corresponding transmission control module (TCM) 40 and provides torque to an output shaft 37. The ECM 36 and the TCM 40 may communicate with each other via serial and/or parallel connections and/or via a control area network (CAN) 42.

The ICE 30 combusts an air/fuel mixture to produce drive torque for a vehicle based on information from a driver input module 44 (e.g., driver input signal DI) and other information described below. In operation, air is drawn into an intake manifold 46 of the ICE 30 through a main throttle valve 48 and/or port throttle valves 50 of a throttle valve assembly 52. The ECM 36 commands a throttle actuator module 54 to regulate opening of the throttle valves 48, 50 to control the amount of air drawn into the intake manifold 46 and/or respective cylinders of the engine 30. Throttle positioning may be based on, for example, information from the driver input module 44 and/or controlled by the shut down control module 36 during a shut down. The ECM 34 commands a fuel actuator module 56 to control the amount of fuel injected into the intake manifold 46, intake runner, and/or cylinders of the engine 30, via for example fuel injectors (a single fuel injector 33 is shown).

The driver input module 44 may receive signals from, for example, sensors of a brake actuator 60 (e.g., brake pedal) and/or an accelerator 62 (e.g., accelerator pedal). The sensors may include a brake sensor 64 and an accelerator sensor 66. The driver input signal DI may include a brake pedal signal BRAKE 68 and an accelerator pedal signal ACCEL 70. Air from the intake manifold 46 is drawn into cylinders of the ICE 30 through intake valves (a single intake valve 72 is shown). While the ICE 30 may include multiple cylinders, for illustration purposes, a single representative cylinder 74 is shown.

The ECM 34 controls the amount of fuel injected into the intake manifold 46 and/or the cylinder 74. The injected fuel mixes with the air and creates the air/fuel mixture in the cylinder 74. A piston (not shown) within the cylinder 74 compresses the air/fuel mixture. Based upon a signal from the ECM 34, a spark actuator module 76 of an ignition system 78 energizes a spark plug 80 in the cylinder 74, which ignites the air/fuel mixture.

The combustion of the air/fuel mixture drives the piston down, thereby driving a rotating crankshaft 82. The piston then begins moving up again and expels the byproducts of combustion through an exhaust valve 84. The byproducts of combustion are exhausted from the vehicle via the exhaust system. The ICE 30 may be a 4-stroke engine where the piston is cycled iteratively through intake, compression, power/expansion and compression strokes.

The intake and exhaust valves 72, 84 may be controlled by a cylinder actuator module 86 via respective camshafts 88, 90 and cam phasers 92, 94. The cam phasers 92, 94 are controlled via a phaser actuator module 96.

The engine system 26 may measure the speed of the crankshaft 82 (engine speed) in revolutions per minute (RPM) using one or more engine position and/or speed sensor(s) 96. The engine position and/or speed sensor(s) 96 may include the position sensor 16 of FIG. 1. The engine position and/or speed sensor(s) 96 may be uni-directional or bi-directional sensors and detect, for example, position of a position indicating wheel 98 on the crankshaft 82. The position indicating wheel 98 may be the same as the position indicating wheel 14 of FIG. 1. Uni-directional sensors detect rotation in a single direction. Bi-directional sensors detect rotation in two directions. Bi-directional sensors may be used to detect, for example, "rock back" of the ICE 30. Rock back refers to when the crankshaft of the engine rotates in a reverse direction due to, for example, a balance between piston and friction forces of the engine and/or due to cylinder pressures.

Temperature of the ICE 30 may be measured using engine coolant and/or oil temperature sensor(s) 100. The temperature sensor(s) 100 may be located within the ICE 30 or at other locations where the coolant and/or oil is circulated, such as on a radiator (not shown).

The pressure within the intake manifold 46 may be measured using a manifold absolute pressure (MAP) sensor 102. In various implementations, engine vacuum may be measured, where engine vacuum is the difference between ambient air pressure and the pressure within the intake manifold 46. The mass of air flowing into the intake manifold 46 may be measured using mass air flow (MAF) sensors 104. The ECM 18 determines cylinder fresh air charge primarily from the MAF sensors 104 and calculates a desired fuel mass using open loop, closed loop and transient fueling algorithms. Fuel injector characterization functions convert the desired fuel mass into an injector on time, which is executed by fuel injector outputs of the ECM 34.

A throttle actuator module 54 may monitor position of the throttle valves 48, 50 using one or more throttle position sensors (TPS) 110. The ambient temperature of air being drawn into the engine system 26 may be measured using an intake air temperature (IAT) sensor 111.

The ECM 34 may communicate with the TCM 40 to coordinate shifting gears in the transmission system 32 and/or to adjust load of the transmission system 32 on the engine 30 during a shut down. For example, the ECM 34 may adjust: oil pressures in a torque converter 120 and/or a transmission 122; engaged states of clutches and gears 124 of the torque converter 120 and the transmission 122; and/or other transmission parameters to adjust load on the engine 30.

The ECM 34 may communicate with a hybrid control module 130 to coordinate operation of the ICE 30 and an electric motor and/or generator (motor/generator) 132. The motor/generator 132 may be used to: assist the ICE 30; replace the ICE 30, and/or start the ICE 30. The motor/generator 132 may supply power to and receive power from a power source 133 (e.g., a battery pack).

The stop-start control system 28 may be a 12 volt (V) stop-start system. A 12V stop-start system may refer to a traditional powertrain system with a different starter/motor that operates on 12 volts. A 12V stop-start system includes a transmission with a pump, such as an auxiliary pump 126, that is external to a transmission and maintains fluid pressure within the transmission to maintain engagement of gear(s) and/or clutch(es). For example, a first gear may be held in an engaged state during auto-stop/start modes using the auxiliary pump 126. In various implementations, the ECM, the TCM and the hybrid control module 102 may be integrated into one or more modules. In the auto-stop/start modes, engine engaging clutch(es) of the transmission system 32 may be disengaged. One or more gears of the transmission system 32 may be engaged while in the auto-stop/start modes.

Figure 3:
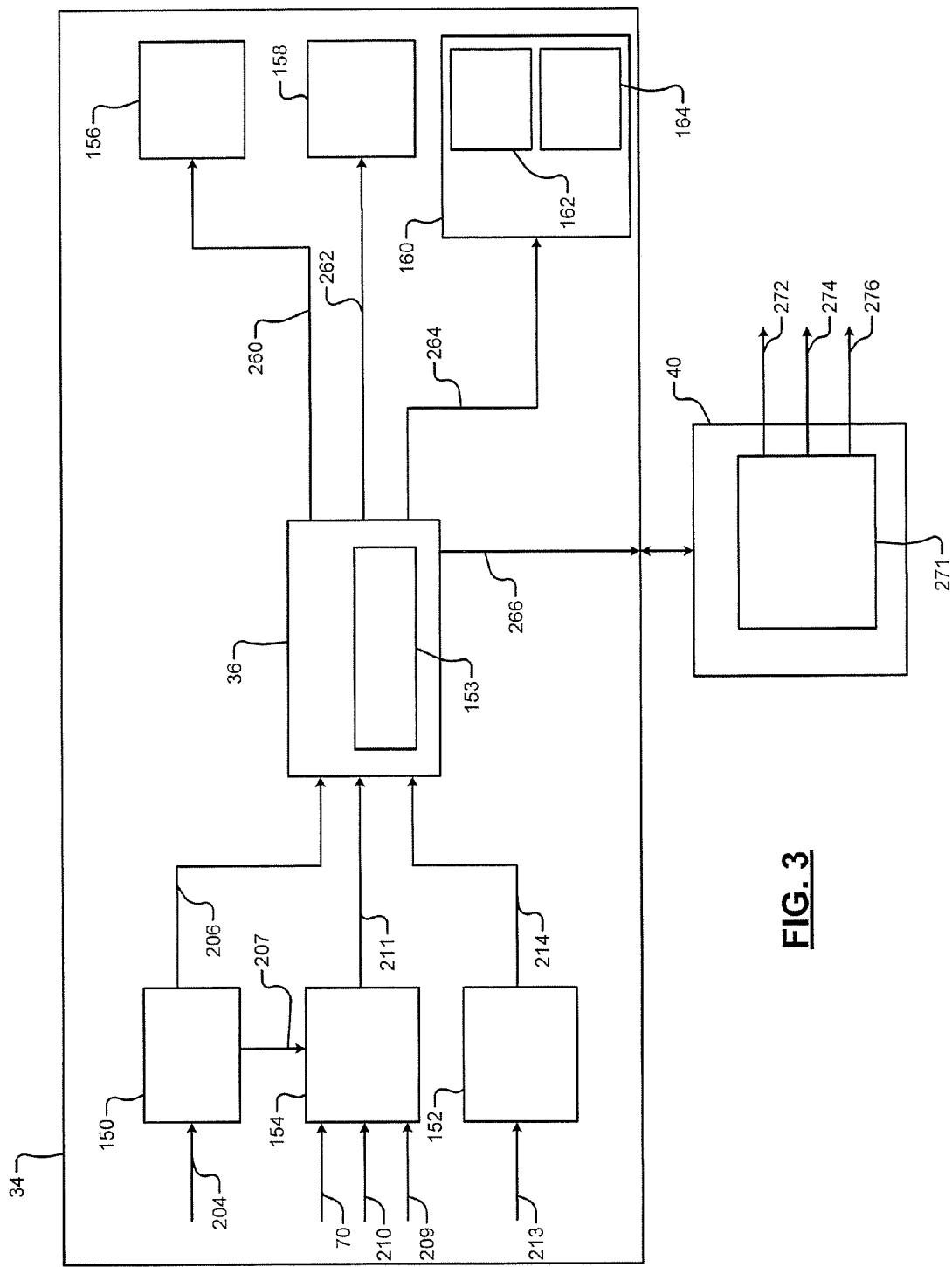
FIG. 3 is a functional block diagram of an engine control module in accordance with the present disclosure.
Figure 4:
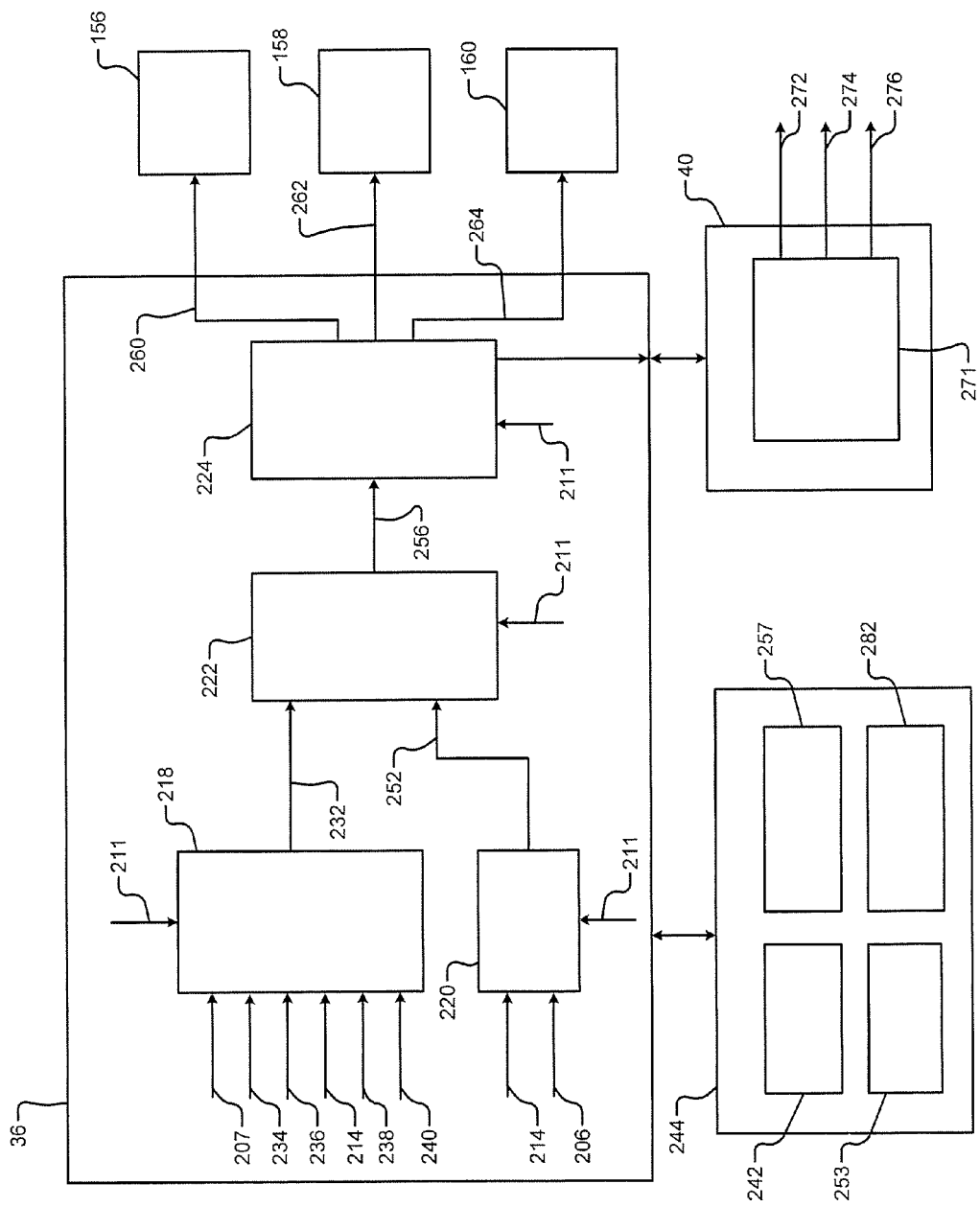
FIG. 4 is a functional block diagram of an shut down control module in accordance with the present disclosure.
Figure 5:
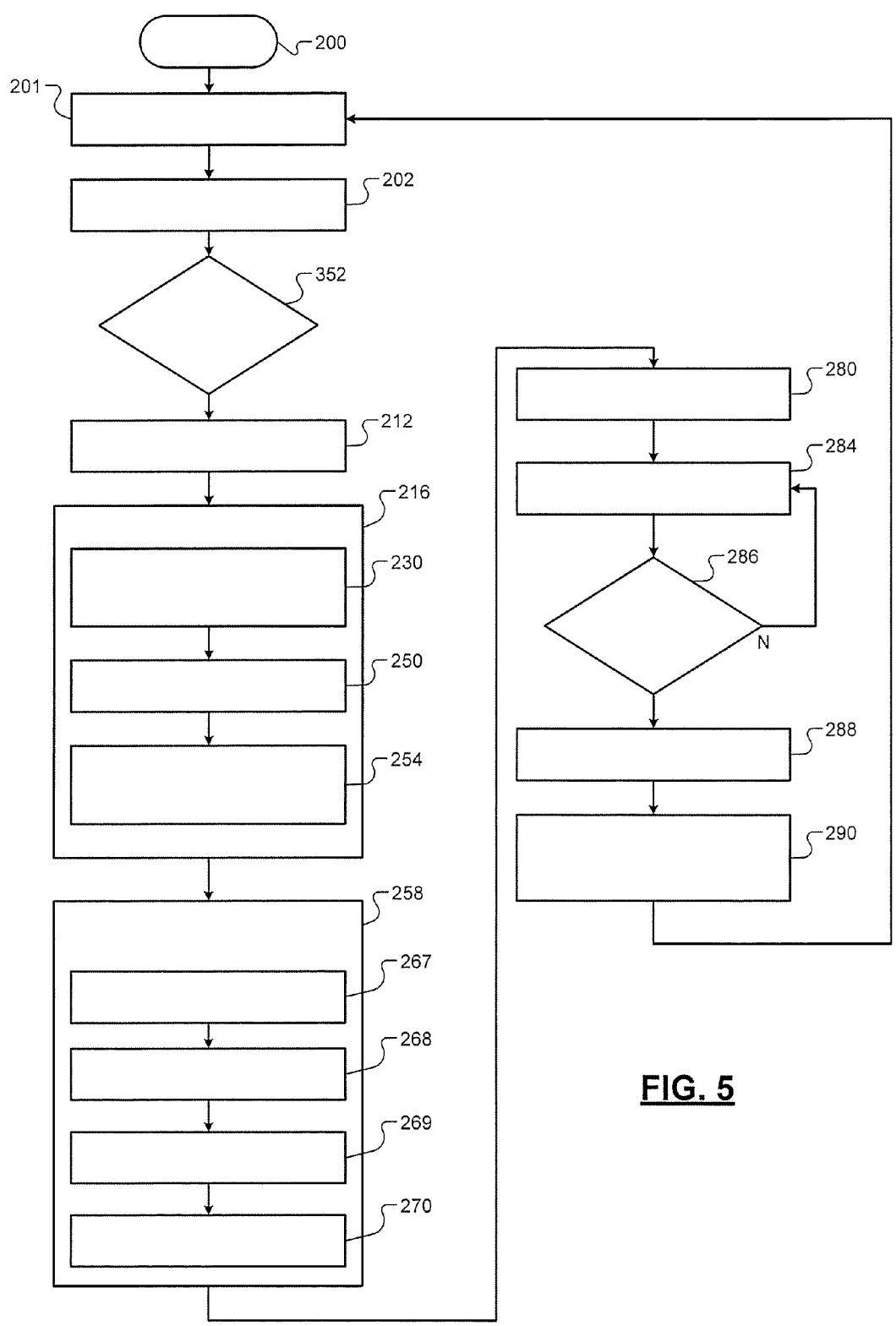
FIG. 5 illustrates a method of operating a stop-start engine control system in accordance with the present disclosure.

Referring now also to FIGS. 3-5, the ECM 34, the shut down control module 36, and a method of operating a stop-start engine control system are shown. The ECM 34 includes an engine position module 150, a stop-start module 152, a manifold pressure module 154, the shut down control module 36, a spark control module 156, a fuel control module 158, and a throttle control module 160. The throttle control module 160 includes a main throttle module 162 and a port throttle module 164, which control positioning of the throttles 48, 50.

Although the method is described primarily with respect to the embodiments of FIGS. 2-4, the method may be applied to other embodiments of the present disclosure. The tasks of the method may be iteratively performed. The method may begin at 200.

At 201, sensor signals are generated. The sensor signals may be signals from, for example, sensors 64, 66, 96, 100, 102, 104, 110, 111. The sensor signals may include position signals, speed signals, pressure signals and/or temperature signals.

At 202, the engine position module 150 determines position of the ICE 30. The position may refer to position of a crankshaft and/or camshaft of the ICE 30. The position is determined base on position sensor signals $PS_1$-$PS_N$ 204 received from, for example, the engine position sensor(s) 96, where N is an integer greater than or equal to 1. The engine position module 150 generates an engine position signal POS1 206 (first position signal). The engine position module 150 may also generate an engine speed signal RPM 207 based on the engine position signal POS1.

At 208, the ECM 34 determines whether to shut down (deactivate) the engine. The ECM 34 may shut down the ICE 34 based on the accelerator signal ACCEL 70 from the accelerator sensor 66, speed of the vehicle Vspd (vehicle speed signal 209), state of the power source 133 (power source signal 210), etc. The state of the power source 133 may refer to a voltage, a current level, and/or a remaining power level of the power source 133. As an example, the ECM 34 may shut down the engine 30 when the accelerator signal is less than a predetermined accelerator value, the speed of the vehicle is less than a predetermined speed, and a power level of the power source 133 is greater than a predetermined power level. The predetermined accelerator value may refer to an accelerator "tip-in" angle. The accelerator signal may be less than the predetermined accelerator value when the accelerator 62 is not actuated and/or tip-in angle is less than a predetermined tip-in angle.

The ECM 34 proceeds to task 212 when the ICE 30 is to be shut down, otherwise the ECM 34 returns to task 201. The stop-start module 152 generates a shut down signal SHTDWN 211 based on the accelerator signal ACCEL 70, the vehicle speed signal 209 and the power source signal 210. The modules of the shut down control module 36 may receive and operate based on the shut down signal SHTDWN 211.

At 212, the manifold pressure module 154 estimates manifold absolute pressure within the manifold 46 based on a first manifold pressure signal MAP1 213 from the MAP sensor 102. The manifold pressure module 152 generates a second manifold pressure signal MAP2 214 based on the first manifold pressure signal MAP1 213.

At 216, the shut down control module 36 initiates a shut down. The shut down module 36 includes a friction module 218, a position estimation module 220, an energy module 222, and a cylinder deactivation module 224.

At 230, the friction module 218 generates a friction signal 232 based on various engine parameter signals. The friction signal indicates an estimate of a sum of friction forces. The engine parameter signals may include the engine speed signal RPM 207, the second manifold pressure signal MAP2 214, an engine coolant temperature signal $T_{Cool}$ 234, an engine oil temperature signal $T_{oil}$ 236, an intake phaser signal Phaser$_{INT}$ 238, and an exhaust phaser signal Phaser$_{EXT}$ 240. The phaser signals Phaser$_{INT}$ 238, Phaser$_{EXT}$ 240 indicate phaser positions for intake and exhaust valves of the ICE 30.

The friction module 218 may estimate a sum of friction forces FRICTION of moving components of the engine based on equations, tables and/or models. The friction signal 232 may indicate the sum of the friction forces FRICTION. As an example, the sum of the friction forces may be based on a friction model 242 of the ICE 30 and stored in memory 244. As another example, the friction signal 232 may be generated using equation 1.

$$\text{FRICTION} = F\{\text{RPM}, T_{Cool}, T_{Oil}, \text{MAP2}, \text{Phaser}_{INT}, \text{Phaser}_{EXT}\} \quad (1)$$

At 250, the position estimation module 220 estimates position of the ICE 30 (e.g., position of the crankshaft 82 or position of one of the camshafts 88, 90) based on equations, tables and/or models. The position estimation module 220 may estimate position of the ICE 30 based on other engine parameters, some of which are stated above. As an example the position of the ICE 30 may be estimated based on, for example the first position signal POS1 and the second manifold pressure signal MAP2. The position estimation module 220 generates a second position signal POS2 252, which may be generated using, for example, equation 2 and/or a position model 253 stored in the memory 244.

$$\text{POS2} = F\{\text{POS1}, \text{MAP2}\} \quad (2)$$

At 254, the energy module 222 determines kinetic energy of the ICE 30 based on equations, tables and/or models. As an example, the energy module 222 may determine the kinetic energy based on the friction signal 232 and the second position signal POS2. The energy module 222 generates a kinetic energy signal ENERGY 256 based on the friction signal 232 and the second position signal POS2 using, for example, equation 3 and/or an energy model 257 stored in the memory 244.

$$\text{ENERGY} = F\{\text{FRICTION}, \text{POS2}\} \quad (3)$$

The kinetic energy signal ENERGY 256 indicates the kinetic energy of the ICE 30 to dissipate by the end of a shut down period. The ICE 30 may be stalled or stopped when the kinetic energy is fully dissipated.

At 258, the shut down control module 36 and/or the cylinder deactivation module 224 shuts down the ICE 30 based on the kinetic energy signal ENERGY 256. The shut down control module 36 and/or the cylinder deactivation module 224 signals one or more of the spark control module 156, the fuel control module 158, the throttle control module 160 and the transmission 40 to dissipate the kinetic energy of the ICE 30.

The shut down control module 36 and/or the cylinder deactivation module 224 stop the ICE 30 at the predetermined stopping position and/or within the predetermined stopping range. The predetermined stopping range includes an upper bound (first position) and a lower bound (second position). A gap (rising or falling edge of gap) of a position indicating wheel (e.g., gap 22 of FIG. 1) of the ICE 30 is approximately 90° away from a position sensor (e.g., position sensor 16 of FIG. 1 or position sensor 96) when the ICE 30 is in the first position. The gap of the position indicating wheel is approximately 270° away from the position sensor when the ICE 30 is in the second position. The predetermined stopping position is within the predetermined stopping range. The predetermined stopping position may be more than 90° and less than 270° away from the position sensor. For example only, the predetermined stopping position may be approximately 180° away from the position sensor. The predetermined stopping position and the predetermined stopping range may be determined relative to the position sensor or some other reference point, such as a fixed point on the ICE 30.

The shut down control module 36 may generate a spark control signal SPARK 260, a fuel control signal FUEL 262, a throttle control signal 264, and/or a transmission request signal TRANS 266 to control stopping of the ICE 30. Control of throttle positions, spark parameters, fuel parameters, and transmission load are shown as tasks 267, 268, 269 and 270.

As a shut down example, the shut down control module 36 may signal throttle control module 160 and/or the throttle modules 162, 164 to position the throttles 48, 50 in selected positions. The positions of the throttles 48, 50 may be adjusted throughout the shut down period to control manifold pressures and cylinder pressures to position the engine in the predetermined stopping position and/or the predetermined stopping range.

As another shut down example, the shut down control module 36 may signal the TCM 40 and/or a transmission load module 271 of the TCM 40 to adjust transmission load on the ICE 30. The transmission load module 271 may generate an oil pressure signal PRESS 272, a clutch control signal CLTCH 274 and/or a gear control signal GEAR 276 to adjust pressure(s) and/or states of the clutches and gears 124. The shut down control module 36 may request a transmission load and/or may request that shifting (up or down) of the transmission system 32 be performed at certain times and/or at a certain rate. The shut down control module 36 may also request that a certain shift pattern be followed. One or more of these requests may be indicated in the transmission request signal TRANS 266. The transmission load module 271 may control up and/or down shifting of the transmission system 32 including shift times, rates and patterns based on transmission request signal TRANS 266.

The cylinder deactivation module 224 may determine which one of the cylinders of the ICE 30 to deactivate first. The one or more cylinders may be deactivated based on, for example, engine operating conditions and/or parameters. For example, a selected cylinder may be deactivated based on engine coolant temperature and transmission load on the ICE 30. The cylinder deactivation module 224 may first deactivate one or more of the cylinders followed by the remaining cylinders. The cylinders may be deactivated sequentially or simultaneously. Simultaneous deactivation of cylinders refers to the deactivation of cylinders within the same period.

As yet another shut down example, the cylinder deactivation module 224 and/or the fuel control module 156 may deactivate fuel to a selected one of the cylinders of the ICE 30 based on, for example, engine operating conditions and/or parameters. For example, the fuel of a selected cylinder may be deactivated based on engine coolant temperature and transmission load on the ICE 30. Other cylinders may be selected, for example, in order of fuel injection timing. In one embodiment, the fuel is deactivated to the cylinders and then throttle positions of the throttles 48, 50 are adjusted to control stopping position of the ICE 30. In this embodiment, the ICE 30 coasts to a stopped position. Air pressures within the manifold 46 and within the cylinders of the ICE 30 are adjusted while the ICE 30 coasts to the stopped position. One or more of the above-stated shut down examples may be performed during a shut down of the ICE 30.

The shut down control module 36 may stop the ICE (e.g., crankshaft 82 and/or camshafts 88, 90) such that pistons of the ICE 30 are in the middle of respective strokes. Each cylinder of the ICE 30 may perform 4 strokes, an intake stroke, a compression stroke, an power/expansion stoke, and an exhaust stroke. As an example, the ICE 30 may include 4 cylinders A-D that may each perform a different stroke at any moment in time. The cylinders A-D may be stopped at partial phase (stroke) positions. Partial phase positions refer to positions between top-dead-center (TDC) and bottom-dead-center (BDC). TDC refers to a piston position farthest position from the crankshaft 82. BDC refers to a piston position closest position to the crankshaft 82. Cylinder A may be in a partial intake stroke position, cylinder B may be in a partial compression stroke position, cylinder C may be in a partial power or expansion stroke position, and cylinder D may be in a partial exhaust stroke position when the ICE 30 is stopped.

The predetermined stopping position may correspond to a middle (50%) position between TDC and BDC for each cylinder of the ICE 30. The predetermined stopping range may correspond with positioning the pistons between the TDC and BDC positions of each cylinder.

Stopping the ICE 30 in the predetermined stopping position and/or the predetermined stopping range allows, for example, the position sensor 96 to detect teeth on the position indicating wheel 98 prior to detection of a gap on the position indicating wheel 98. This allows accurate detection and/or determination of engine position and speed. Stopping pistons of the ICE 30 in the middle of respective strokes may also improve startup performance of the engine.

The cylinder deactivation module 224 may estimate a number of engine cycles, strokes, crankshaft revolutions, and/or camshaft revolutions to stop the ICE 30 based on the estimated kinetic energy. As an example, the cylinder deactivation module 224 may stop the ICE 30 within approximately 3-4 crankshaft revolutions from when: the kinetic energy is determined; the shut down signal 211 is generated; and/or the ICE 30 (e.g., crankshaft 82 or one of the camshafts 88, 90) is in a predetermined position and/or within a predetermined position range. The more kinetic energy to dissipate the more engine cycles, strokes, crankshaft revolutions, and/or camshaft revolutions performed.

At 280, the ECM 34, the engine position module 150, and/or the position estimation module 220 may estimate the stopped position 282 of the ICE 30 and store the stopped position 282 in the memory 244.

At 284, sensor signals may be generated as at task 201. At 286, the ECM 34 determines whether to start the ICE 30. The ICE 30 may be started, for example, when the brake signal BRAKE 61 and the accelerator signal ACCEL 70 indicate that the brake pedal 60 is released and the accelerator pedal 62 is actuated. The ECM 34 proceeds to task 288 when the ICE 30 is to be started, otherwise the ICE 30 returns to task 284.

At 288, the engine position module 150 estimates position of the ICE 30. The estimated engine position may be based on the sensor signals and/or the stopped position 282. As the position of the ICE 30 is in the predetermined stopping position and/or within the predetermined stopping range, the position sensor(s) 96 can detect several teeth of the position indicating wheel 98 prior to a gap of the position indicating wheel 98 passing by the position sensor(s) 96. This allows the engine position module 150 to accurately detect the position of the position indicating wheel 98 and thus position of the ICE 30 (i.e. position of the crankshaft 82 and/or positions of the camshafts 88, 90).

At 290, the ECM 34 performs an automatic start (auto-start). An auto-start refers to activation and/or startup of an engine that is not based on, for example, a key start or push-button start, but rather is initiated by the ECM 34 based on torque requests. An auto-start occurs after a vehicle is started (e.g., key start) and during, for example, a key cycle. A key cycle refers to a period between a first time when a vehicle is started and a second time when a vehicle is shutdown. The ECM 34 may operate the ICE 30 to generate engine output torque based on the estimated engine position determined at 288. The ECM may return to task 201 after task 290.

The above-described tasks are meant to be illustrative examples; the tasks may be performed sequentially, synchronously, simultaneously, continuously, during overlapping time periods or in a different order depending upon the application.

The above-described embodiments provide a robust and accurate engine position detecting system. Shut down of an engine is provided through internal control of engine parameters and/or by controlling transmission load on the engine. Consistent and repeatable stopping positions are provided by the described embodiments.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system comprising:
    a stop-start module that generates a shut down signal to shut down an engine;
    a friction module that generates a friction signal based on the engine shut down signal, wherein the friction signal indicates an estimate of a sum of friction forces between components of the engine;
    a position module that estimates a position of the engine and generates a position signal;
    an energy module that estimates kinetic energy of the engine based on the friction signal and the position signal; and
    a cylinder deactivation module that stops the engine based on the kinetic energy in at least one of (i) a predetermined position and (ii) a predetermined range.

2. The engine system of claim 1, wherein the stop-start module generates the shut down signal based on an accelerator signal.

3. The engine system of claim 1, wherein the stop-start module generates the shut down signal based on at least one of a state of a power source and a speed of a vehicle.

4. The engine system of claim 1, wherein the friction module generates the friction signal based on a speed of the engine and a temperature of the engine.

5. The engine system of claim 1, wherein the friction module generates the friction signal based on a pressure of an intake manifold of the engine.

6. The engine system of claim 1, wherein the friction module generates the friction signal based on a position of a cam phaser of the engine.

7. The engine system of claim 1, wherein the position module generates the position signal based on a signal from a position sensor and a pressure of a manifold.

8. The engine system of claim 1, wherein:
    the cylinder deactivation module stops the engine in the predetermined range;
    the predetermined range is bounded by a first position and a second position;
    a gap of a position indicating wheel of the engine is 90° away from a position sensor when the engine is in the first position; and
    the gap of the position indicating wheel is 270° away from the position sensor when the engine is in the second position.

9. The engine system of claim 1, wherein:
the cylinder deactivation module stops the engine in the predetermined position;
the predetermined position is between a first position and a second position;
a gap of a position indicating wheel of the engine is 90° away from a position sensor when the engine is in the first position; and
the gap of the position indicating wheel is 270° away from the position sensor when the engine is in the second position.

10. The engine system of claim 9, wherein the predetermined position is greater than the first position away from the position sensor and less than he second position away from the position sensor.

11. The engine system of claim 1, further comprising a throttle module that controls position of a throttle of the engine based on a throttle control signal from the cylinder deactivation module to stop the engine in the at least one of (i) the predetermined position and (ii) the predetermined range.

12. The engine system of claim 1, further comprising:
a shut down control module that generates a transmission request signal and comprises the cylinder deactivation module; and
a transmission control module that adjusts load of the transmission on the engine based on the transmission request signal to stop the engine in the at least one of (i) the predetermined position and (ii) the predetermined range.

13. The engine system of claim 12, wherein the transmission control module adjusts at least one of an oil pressure, a state of a clutch, and a state of a gear to stop the engine in the at least one of (i) the predetermined position and (ii) the predetermined range.

14. A method of operating a stop-start system comprising:
generating a shut down signal to shut down an engine;
generating a friction signal based on the engine shut down signal, wherein the friction signal indicates an estimate of a sum of friction forces between components of the engine;
estimating a position of the engine and generating a position signal;
estimating kinetic energy of the engine based on the friction signal and the position signal; and
stopping the engine based on the kinetic energy in at least one of (i) a predetermined position and (ii) a predetermined range.

15. The method of claim 14, wherein the shut down signal is generated based on an accelerator signal, a state of a power source, and a speed of a vehicle.

16. The method of claim 14, wherein the friction signal is generated based on a speed of the engine, a temperature of the engine, a pressure of an intake manifold of the engine, a position of a cam phaser of the engine.

17. The method of claim 14, further comprising stopping the engine in the predetermined range, wherein:
the predetermined range is bounded by a first position and a second position;
a gap of a position indicating wheel of the engine is 90° away from a position sensor when the engine is in the first position; and
the gap of the position indicating wheel is 270° away from the position sensor when the engine is in the second position.

18. The method of claim 14, further comprising stopping the engine in the predetermined position, wherein:
the predetermined position is between a first position and a second position;
a gap of a position indicating wheel of the engine is 90° away from a position sensor when the engine is in the first position; and
the gap of the position indicating wheel is 270° away from the position sensor when the engine is in the second position.

19. The method of claim 14, further comprising:
generating a transmission request signal;
controlling position of a throttle of the engine based on a throttle control signal to stop the engine in the at least one of (i) the predetermined position and (ii) the predetermined range; and
adjusting load of the transmission on the engine based on the transmission request signal to stop the engine in the at least one of (i) the predetermined position and (ii) the predetermined range.

* * * * *